C. E. BEAN.
STEAM WASHER.
APPLICATION FILED MAY 4, 1916.

1,202,150.

Patented Oct. 24, 1916.

Witness:
John Enders

Inventor:
Charles E. Bean,
by Robert Burns,
Atty.

UNITED STATES PATENT OFFICE.

CHARLES EVANS BEAN, OF GARNETT, KANSAS.

STEAM-WASHER.

1,202,150.   Specification of Letters Patent.   Patented Oct. 24, 1916.

Application filed May 4, 1916. Serial No. 95,403.

*To all whom it may concern:*

Be it known that I, CHARLES EVANS BEAN, a citizen of the United States of America, and a resident of Garnett, in the county of Anderson, State of Kansas, have invented certain new and useful Improvements in Steam-Washers, of which the following is a specification.

This invention relates to that class of steam washers, which constitutes the subject matter of Letters Patent No. 884,064, issued to me April 7, 1908, and has for its objects:—To provide a structural formation and association of parts whereby an effective circulation of the hot water and steam from the lower to the upper portion of the casing is attained in a very effective manner, and with which an agitating and rubbing action upon the articles operated on is also attained. To provide a simple and convenient means for securing the hot water circulating partition in a readily removable manner in the lower portion of the casing of the washer. All as will hereinafter more fully appear.

Figure 1:
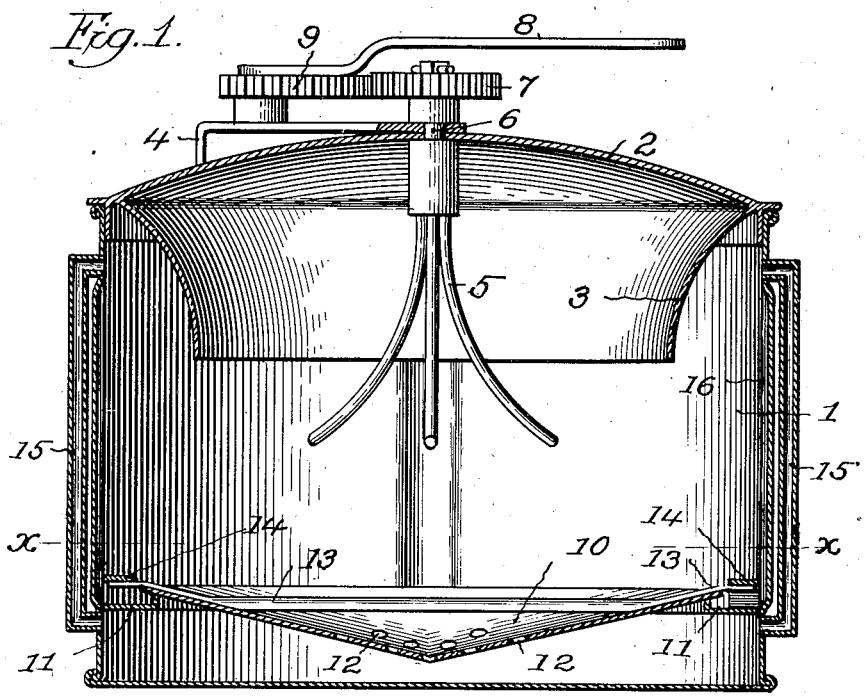
Figure 2:
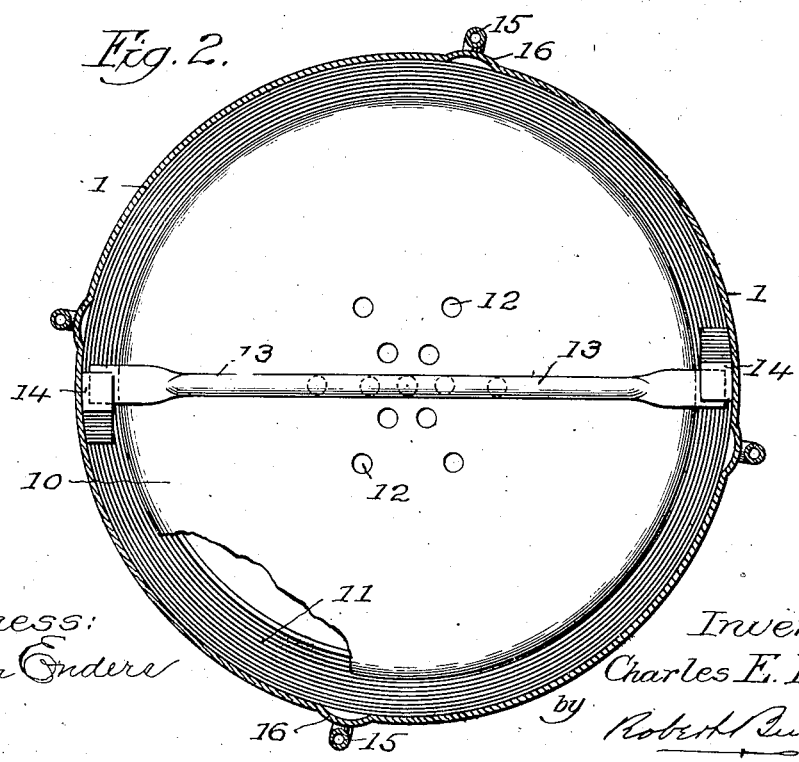

In the accompanying drawings: Figure 1 is a central vertical sectional elevation of a steam washer embodying the present improvements. Fig. 2, is a sectional plan view, with parts removed, broken away and in section, for the better illustration of structural details.

Similar reference numerals indicate like parts in both views.

Referring to the drawings, 1 designates the main casing of the washer, preferably of a cylindrical form and having a flat bottom upon which it may rest upon the top of a stove or heater and be effectively heated therefrom.

2 designates a cover, preferably of a dome shape, and removably secured to the open top of the casing 1 by any ordinary and suitable fastening means.

3 designates an annular skirt depending from the cover 2 near its circular margin, and preferably of the tapering form shown. Said skirt 3 is adapted in connection with the adjacent portion of the wall of the casing 1, to provide an annular steam chamber around the upper portion of said casing as shown.

4 designates a frame or spider secured to the cover 2 and formed with bearings for the stirrer or dolly 5 of the washer. Said dolly 5 is of the conventional form and has a carrying shaft 6 extending through the frame or spider 3 and provided with a pinion 7 at its upper end.

8 designates an operating arm provided with a sector gear 9, adapted for operative engagement with the pinion 7 of the dolly 5 aforesaid. Said operating arm is disposed horizontally above the cover 3 and is pivotally supported on the spider 4 aforesaid.

10 designates a hot water circulating partition, preferably of the inverted cone shape shown, and removably secured in place within the casing 1 and near the bottom of the same and supported on an annular vertical flange on an inwardly extending ledge 11 on the wall of the casing 1, in connection with the fastening means hereinafter described. The flanged ledge provides an annular trough over which the periphery of the partition extends toward the wall of the main casing. The partition 10 is formed with a series of perforations 12 in its central portion for the passage of the wash water down into the sub-chamber beneath the partition to replace the hot water and steam discharged from said sub-chamber by the means hereinafter described.

13 designates a horizontal locking rail secured by its upwardly inclined ends centrally within the chamber of the partition 10, and adapted for a turning movement therewith and in such turning movement to engage the extremities of its ends beneath oppositely extending bracket lugs 14 on the wall and ledge 11 of the casing 1, to secure said partition 10 in place in one instance, and in another instance to effect a ready release of said partition. The locking rail 13 is adapted for operation by the operator grasping the same near its central portion the cone formation of the partition 10 providing ample space for the fingers of the operator in so grasping the said rail. In addition to the latching and unlatching movements above mentioned, the described structural arrangement affords a ready and substantial means for effecting a manual insertion and removal of the partition 10 as required.

15 designates a series of vertically disposed circulating tubes arranged adjacent to the outside of the circular wall of the casing 1, and communicating at their horizontal lower ends with the sub-chamber beneath the partition 10 and ledge 11. At their horizontal upper ends, the tubes 15 communicate with the annular chamber formed by the depending skirt 3 aforesaid. Said tubes 15 are adapted to convey the hot water and steam to the upper part of the washer and discharge said hot water and steam upon the articles being washed with a view to a rapid and thorough cleansing operation.

16 designates a series of vertical outwardly extending bulges or ridges formed in the circular wall of the casing 1 and providing elongated pockets spaced apart and located in adjacent relation to and positioned within the aforesaid series of circulating tubes 15. The inner vertical margins or corners of said pockets are adapted to act as efficient rubbers for the articles being washed, as said articles are stirred and turned within the casing 1 by the stirrer or dolly 5 above described. The elongated imperforate exterior pockets do not extend the whole height of the main casing as in ordinary corrugated casings, vessels, or receptacles; but only part way of the height thereof from the annular trough above the sub-chamber to points beneath the horizontal outlets, beneath the upper ends of the circulating tubes.

Having thus fully described my said invention, what I claim as new and desire to secure by Letters Patent, is:—

1. A steam washer of the type described comprising a main casing having a sub-chamber, an annular inwardly extending ledge formed with a vertical flange and providing an annular trough above the sub-chamber, oppositely-extending bracket-lugs on the wall of the main casing over the annular trough, and a removable perforated inverted cone-shaped partition seated on the vertical flange of the annular ledge and extending partly over the annular trough, having a horizontal locking rail formed with inclined ends by which it is secured centrally within the chamber of the partition and with horizontal extremities on said inclined ends adapted to be engaged with, and disengaged from, the bracket bars.

2. A steam washer of the type described, comprising a main casing having a sub-chamber and a series of vertical outwardly-projecting imperforate bulges formed in the wall of the main casing and extending part-way of the height of the main casing above the sub-chamber and providing elongated pockets having vertical rubbing margins, an annular inwardly-extending ledge formed with a vertical flange and providing an annular trough above the sub-chamber and beneath the bulges with which the lower ends of the latter communicate, and a series of vertical circulating tubes having horizontal lower ends communicating with the sub-chamber beneath the ledge and bulges, and horizontal upper ends communicating with the chamber of the main-casing beneath the top thereof and above the bulges.

Signed at Garnett, Kansas, this 29 day of April 1916.

CHARLES EVANS BEAN.